(12) United States Patent
Arendt et al.

(10) Patent No.: US 11,797,881 B2
(45) Date of Patent: Oct. 24, 2023

(54) MACHINE LEARNING MODEL EXPLANATION APPARATUS AND METHODS

(71) Applicant: Battelle Memorial Institute, Richland, WA (US)

(72) Inventors: Dustin Arendt, Richland, WA (US); Zhuanyi Huang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 730 days.

(21) Appl. No.: 16/555,530

(22) Filed: Aug. 29, 2019

(65) Prior Publication Data

US 2020/0074331 A1    Mar. 5, 2020

Related U.S. Application Data

(60) Provisional application No. 62/725,190, filed on Aug. 30, 2018.

(51) Int. Cl.
  *G06N 20/00* (2019.01)
  *G06N 5/045* (2023.01)
  *G06F 18/2115* (2023.01)
  *G06F 18/2413* (2023.01)
  *G06F 18/243* (2023.01)

(52) U.S. Cl.
  CPC ......... *G06N 20/00* (2019.01); *G06F 18/2115* (2023.01); *G06F 18/24147* (2023.01); *G06F 18/24323* (2023.01); *G06N 5/045* (2013.01)

(58) Field of Classification Search
  CPC ........ G06N 5/045; G06N 20/00; G06N 5/003; G06K 9/6231; G06K 9/6276; G06K 9/6282; G06K 9/6256; G06K 9/6273; G06K 9/6269; G06V 10/82
  See application file for complete search history.

(56) References Cited

U.S. PATENT DOCUMENTS

2020/0175367 A1    6/2020  Shafto et al.
2021/0049512 A1*   2/2021  Chatterjee .............. G06N 5/025

OTHER PUBLICATIONS

Kim, B., Khanna, R. and Koyejo, O.O., 2016. Examples are not enough, learn to criticize! criticism for interpretability. Advances in neural information processing systems, 29.*

(Continued)

*Primary Examiner* — Zhitong Chen
(74) *Attorney, Agent, or Firm* — Wells St. John P.S.

(57) ABSTRACT

Explanation apparatus and methods are described. In one aspect, an explanation apparatus includes processing circuity configured to access a source instance which has been classified by a machine learning model; create associations of the source instance with a plurality of training instances; and process the associations of the source instance and the training instances to identify a first subset of the training instances which have less relevance to the classification decision of the source instance by the machine learning model compared with a second subset of the training instances; and an interface configured to communicate information to a user, and wherein the processing circuitry is configured to control the user interface to communicate the second subset of the training instances to the user as evidence to explain the classification of the source instance by the machine learning model.

23 Claims, 3 Drawing Sheets

(56) References Cited

OTHER PUBLICATIONS

Arras, L., Horn, F., Montavon, G., Müller, K.R. and Samek, W., 2017. "What is relevant in a text document?": An interpretable machine learning approach. PloS one, 12(8), p. e0181142.*

Papernot, N. and McDaniel, P., 2018. Deep k-nearest neighbors: Towards confident, interpretable and robust deep learning. arXiv preprint arXiv:1803.04765.*

"Why should i trust you?" Explaining the predictions of any classifier. In Proceedings of the 22nd ACM SIGKDD international conference on knowledge discovery and data mining (pp. 1135-1144).*

Arendt et al., "Crush Your Data with ViC2ES Then CHISSL Away", IEEE Symposium on Visualization for Cyber Security (VizSec), 2018, United States, 8 pages.

Arendt et al., U.S. Appl. No. 62/725,190, filed Aug. 30, 2018, titled "Machine Learning Apparatus and Methods", 42 pages.

Cai et al., "The Effects of Example-Based Explanations in a Machine Learning Interface", Proceedings of the 24th International Conference on Intelligent User Interfaces, Mar. 17-20, 2019, United States, pp. 258-262.

Carlsson et al., "Fibres of Failure: Classifying Errors in Predictive Processes", arXiv, Feb. 9, 2018, United States, 10 pages.

Carriere et al., "Statistical Analysis and Parameter Selection for Mapper", Journal of Machine Learning Research 19, May 2017, United States, 39 pages.

Coppers et al., "Intellingo: An Intelligible Translation Environment", Proceedings of the 2018 CHI Conference on Human Factors in Computing, Apr. 21-26, 2018, Canada, 13 pages.

Dzindolet et al., "The Role of Trust in Automation Reliance", International Journal of Human-Computer Studies vol. 58, Issue 6, Jun. 2003, pp. 697-718.

Gebhart et al., "Adversary Detection in Neural Networks via Persistent Homology", arXiv, Nov. 28, 2017, United States, 16 pages.

Ghrist, "Barcodes: The Persistent Topology of Data", Bulletin of the American Mathematical Society vol. 45, No. 1, Oct. 2007, United States, pp. 61-75.

Goodfellow et al., "Explaining and Harnessing Adversarial Examples", arXiv, Dec. 2014, United States, 10 pages.

Guyon et al., "An Introduction to Variable and Feature Selection", Journal of Machine Learning Research 3, 2003, United States, pp. 1157-1182.

Guyon et al., "Gene Selection for Cancer Classification Using Support Vector Machines", Machine Learning vol. 46, 2002, Netherlands, pp. 389-422.

Hagberg et al., "Exploring Network Structure, Dynamics, and Function Using NetworkX", Proceedings of the 7th Python in Science Conference, 2008, United States, pp. 11-15.

Hunter, "Matplotlib: A 2D Graphics Environment", Scientific Programming, IEEE Computing in Science & Engineering, 2007, United States, pp. 90-95.

Indyk et al., "Approximate Nearest Neighbors: Towards Removing the Curse of Dimensionality", ACM Symposium on Theory of Computing, 1998, United States, pp. 604-613.

Jian et al., "Foundations for an Empirically Determined Scale of Trust in Automated Systems", United States Air Force Research Laboratory Interim Report, Feb. 1998, United States, 48 pages.

Jones et al., "SciPy: Open Source Scientific Tools for Python", available online at https://www.scipy.org/, 2001, 1 page.

Kamruzzaman et al., "Characterizing the Role of Environment on Phenotype Traits Using Topological Data Analysis", Proceedings of the 7th ACM International Conference on Bioinformatics, Computational Biology, and Health Informatics, 2016, United States, pp. 487-488.

Koh et al., "Understanding Black-Box Predictions via Influence Functions", Proceedings of the 34th International Conference on Machine Learning, 2017, Australia, 11 pages.

Krause et al., "INFUSE: Interactive Feature Selection for Predictive Modeling of High Dimensional Data", IEEE Transactions on Visualization and Computer Graphics vol. 20, No. 12, Dec. 2014, United States, pp. 1614-1623.

Krause et al., "Interacting with Predictions: Visual Inspection of Black-Box Machine Learning Models", Proceedings of the 2016 CHI Conference on Human Factors in Computing Systems, May 2016, United States, pp. 5686-5697.

Krause et al., "Using Visual Analytics to Interpret Predictive Machine Learning Models", ICML Workshop on Human Interpretability in Machine Learning, 2016, United States, pp. 106-110.

Lum et al., "Extracting Insights from the Shape of Complex Data Using Topology", Scientific Reports, www.nature.com, 2013, United Kingdom, 8 pages.

McInnes et al., "UMAP: Uniform Manifold Approximation and Projection for Dimension Reduction", arXiv, Feb. 2018, United States, 18 pages.

NetworkX, "Dijkstra Predecessor and Distance", available online at https://networkx.github.io/documentation/networkx-1.2/reference/generated/networkx.dijkstra_predecessor_and_distance.html, Aug. 22, 2019, 1 page.

Oliphant, "Guide to NumPy", vol. 1, Dec. 7, 2006, United States, 378 pages.

Pedregosa et al., "Scikit-Learn: Machine Learning in Python", Journal of Machine Learning Research 12, Oct. 2011, United States, pp. 2825-2830.

Ribeiro et al., "'Why Should I Trust You?' Explaining the Predictions of Any Classifier", Proceedings of the 22nd ACM SIGKDD International Conference on Knowledge Discovery and Data Mining, ACM, 2016, United States, pp. 1135-1144.

Saul et al., "KeplerMapper: Python Implementation of Mapper for Visualizing Structure and Shape of High-Dimensional Data" available online at http://doi.org/10.5281/zenodo.1054444, Nov. 2017, 3 pages.

Saul et al., "Machine Learning Explanations with Topological Data Analysis", Workshop on Visualization for AI Explainability, available online at https://sauln.github.io/blog/tda_explanations/, Oct. 2018, 18 pages.

Scikit-learn, "sklearn.neighbors.BallTree", available online at https://scikit-learn.org/stable/modules/generated/sklearn.neighbors.BallTree.html, Aug. 13, 2018, 6 pages.

Scikit-learn, "sklearn.neighbors.kneighbors_graph", available online at http://scikit-learn.org/stable/modules/generated/sklearn.neighbors.kneighbors_graph.html, Aug. 6, 2018, 2 pages.

Shafto et al., "Explainable Decisions of Algorithms Using Examples", available online at https://www.researchwithnj.com/en/publications/explainable-decisions-of-algorithms-using-examples, Feb. 2019, 3 pages.

Silva et al., "Evaluation of Features for Leaf Discrimination", International Conference Image Analysis and Recognition, Springer, 2013, Germany, pp. 197-204.

Singh et al., "Topological Methods for the Analysis of High Dimensional Data Sets and 3D Object Recognition", Eurographics Symposium on Point-Based Graphics, 2007, Prague, 11 pages.

Street et al., "Nuclear Feature Extraction for Breast Tumor Diagnosis", IS&T/SPIE International Symposium on Electronic Imaging: Science and Technology vol. 1905, 1993, United States, 10 pages.

Tamagnini et al., "Interpreting Black-Box Classifiers Using Instance-Level Visual Explanations", ACM Proceedings of the 2nd Workshop on Human-in-the-Loop Data Analytics, 2017, United States, 6 pages.

Torres et al., "Tracking Resilience to Infections by Mapping Disease Space", PLOS Biology, Apr. 2016, United States, 19 pages.

Wachter et al., "Counterfactual Explanations without Opening the Black Box: Automated Decisions and the GDPR", Harvard Journal of Law & Technology vol. 31, No. 2, Spring 2018, United States, pp. 842-887.

West, "Shortest Paths", Introduction to Graph Theory, Second Edition, Prentice Hall, 1996, United States, pp. 97-100.

Xiao et al., "Fashion-MNIST: A Novel Image Dataset for Benchmarking Machine Learning Algorithms", arXiv, Aug. 25, 2017, United States, 6 pages.

(56) References Cited

OTHER PUBLICATIONS

Yang et al., "Explainable Artificial Intelligence via Bayesian Teaching", Neural Information Processing Systems Workshop, 2017, United States, 11 pages.

* cited by examiner

MACHINE LEARNING MODEL EXPLANATION APPARATUS AND METHODS

RELATED PATENT DATA

This application claims the benefit of U.S. Provisional Patent Application Ser. No. 62/725,190, filed Aug. 30, 2018, titled "Machine Learning Apparatus and Methods", the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to machine learning model explanation apparatuses and associated methods.

BACKGROUND OF THE DISCLOSURE

Automated systems which incorporate machine learning techniques are becoming more commonplace both in people's personal lives and in work environments, including for example, self-driving cars, automated systems in electrical transmissions, recommender systems, and automated data analysis.

Although advancements in automated systems have resulted in powerful systems which have enhanced capabilities and are used in an increasing number of applications, the systems may still make mistakes which results in people's misuse or over-reliance on automation. Furthermore, the capabilities of the automated systems may also be underestimated by users which may lead to disuse, neglect or underutilization of the automation systems which may otherwise be capable of performing desired tasks. Accordingly, a user's trust in the ability of automated systems to accurately process information is an important factor in their decisions to use automated systems, and additionally, trust influences the reliance of the users on the implementation and use of automated systems.

Some of the aspects of the present disclosure are directed towards apparatus and methods which assist users with understanding machine learning models and to develop trust in the automated systems to ensure the automated systems are used appropriately. As described in example embodiments herein, the apparatus and methods identify and present evidence to a user to assist with explaining decisions of machine learning models. Additional aspects are also described in the detailed description set forth below.

BRIEF DESCRIPTION OF THE DRAWINGS

Example embodiments of the disclosure are described below with reference to the following accompanying drawings.

DETAILED DESCRIPTION OF THE DISCLOSURE

Figure 1:
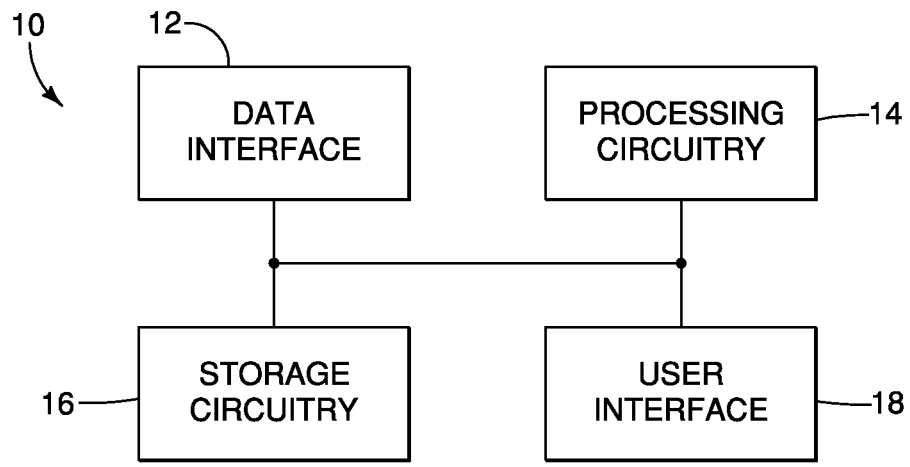
FIG. 1 is a functional block diagram of a computing system according to one embodiment.

This disclosure is submitted in furtherance of the constitutional purposes of the U.S. Patent Laws "to promote the progress of science and useful arts" (Article 1, Section 8).

A machine learning model is a mathematical model built using training data which includes a plurality of training instances. A trained machine learning model is capable of making predictions or decisions, such as classifying received data (e.g., classify different types of tree leaves, classify emails as spam or not in illustrative examples). Machine learning models may be used in applications where it is difficult or infeasible to construct a computer program to perform a desired job.

Machine learning models are utilized to classify received inputs, however the reasoning of the machine learning models behind the classification decisions of the inputs is unknown to the user. As mentioned above, some embodiments of the present application are directed to apparatus and methods which assist users with understanding machine learning models including providing explanations of classification decisions of inputs by machine learning models. In one embodiment, the explanation of a classification decision by the model may be provided by selecting or identifying evidence which may be provided to the user which assists with their understanding of the classification decision. Evidence which is used to explain a classification decision of a model includes selected training instances which were used to train the machine learning model in one embodiment described in further detail below.

According to one embodiment, an explanation apparatus includes processing circuitry configured to access a source instance which has been classified by a machine learning model; create associations of the source instance with a plurality of training instances; and process the associations of the source instance and the training instances to identify a first subset of the training instances which have less relevance to the classification decision of the source instance by the machine learning model compared with a second subset of the training instances; and an interface configured to communicate information to a user, and wherein the processing circuitry is configured to control the user interface to communicate the second subset of the training instances to the user as evidence to explain the classification of the source instance by the machine learning model.

According to another embodiment, an explanation apparatus comprises processing circuitry configured to generate a k-nearest neighbors graph comprising a source instance and a plurality of training instances, and wherein the source instance and the training instances have a plurality of different classifications identified by a machine learning model; create a shortest-path tree from the source instance to the training instances; first remove each of the training instances from the shortest-path tree which have a parent training instance in the shortest-path tree which has a classification different than the classification of the source instance; second remove the training instances from the shortest-path tree which are non-leaf nodes in the shortest-path tree and which have no descendant instances which have a classification different than the classification of the source instance; and after the first and second removings, initiate communication of at least one of the remaining training instances of the shortest-path tree to a user as evidence to explain the classification of the source instance by the machine learning model. Additional embodiments are described below.

Referring to FIG. 1, a computing system 10 is shown which is configured to assist a user with understanding classification decisions of a machine learning model and may be referred to as an explanation apparatus. Other embodiments of computing system 10 are possible including more, less and/or alternative components.

Data interface 12 is configured to implement bi-directional communications with respect to computing system 10 including receiving data from external devices and outputting data to external devices. In one embodiment, data interface 12 is configured to receive a previously-trained machine learning model, raw data (e.g., text, images) of training instances which were used to train the machine learning model, and a raw data of a source instance to be classified by the machine learning model.

In one embodiment, processing circuitry 14 is arranged to process data, control data access and storage, issue commands, and control other desired operations to implement various functions discussed below. Processing circuitry 14 may comprise circuitry configured to implement desired programming provided by appropriate computer-readable storage media in at least one embodiment. For example, the processing circuitry 14 may be implemented as one or more processor(s) and/or other structure configured to execute executable instructions including, for example, software and/or firmware instructions. Other example embodiments of processing circuitry 14 include hardware logic, PGA, FPGA, ASIC, state machines, and/or other structures alone or in combination with one or more processor(s). These examples of processing circuitry 14 are for illustration and other configurations are possible.

In one embodiment described below, processing circuitry 14 is configured to execute a machine learning model to classify instances, generate model representations of instances, and process the model representations to identify evidence (e.g., relevant training instances of the model) to present to a user to explain a classification decision of a source instance by the machine learning model.

Storage circuitry 16 is configured to store programming such as executable code or instructions (e.g., software and/or firmware) and other digital data, for example data received via data interface 12 and may include computer-readable storage media. At least some embodiments or aspects described herein may be implemented using programming stored within one or more computer-readable storage medium of storage circuitry 16 and configured to control appropriate processing circuitry 14.

The computer-readable storage medium may be embodied in one or more articles of manufacture which can contain, store, or maintain programming, data and/or digital information for use by or in connection with an instruction execution system including processing circuitry 14 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 18 is configured to interact with a user, for example including a display device to convey data to a user (e.g., displaying visual images and text for observation by the user) as well as an input device such as a keyboard for receiving inputs from the user.

Computing system 10 is configured to process outputs from the machine learning model to identify relevant evidence to present to the user to explain a decision of the machine learning model, including for example explaining a classification decision of a source instance (which may also be referred to as an input instance) by the machine learning model.

In some embodiments, the computing system 10 may identify relevant evidence to explain classification decisions of different types of machine learning models. Example operations performed by the computing system 10 to identify relevant evidence are discussed below with respect to previously-trained machine learning models including a Support Vector Machine (SVM) model and an artificial neural network (ANN) model, although the computing system 10 may also be used with other machine learning models in other applications.

Figure 2:
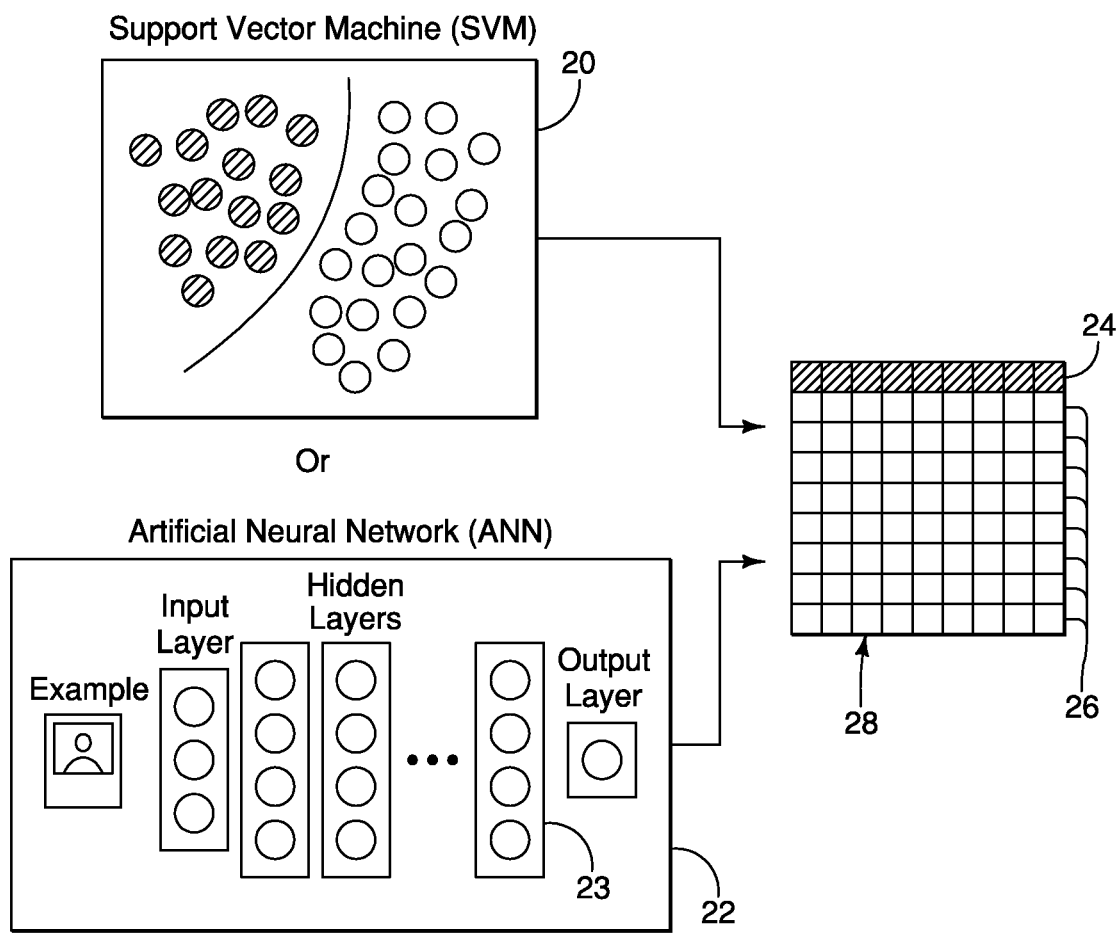
FIG. 2 is an illustrative representation of the creation of a representation matrix from one of two example machine learning models.

Referring to FIG. 2, operations performed by computing system 10 with respect two example already-trained machine learning models including a Support Vector Machine model 20 and an Artificial Neural Network model 22 are described.

The computing system 10 accesses one of the models 20 or 22 (e.g., a previously-trained machine learning classifier), raw data of an input or source instance to be classified by the model 20 or 22 and the raw data of the respective data set of training instances which were used to train the model 20 or 22. The computing system 10 may access the model 20 or 22 and raw data regarding the source and training instances in any appropriate manner, such as via data interface 12 or storage circuitry 16.

In one embodiment, the computing system 10 thereafter uses the respective model 20 or 22 to generate model representations of the source instance and the training instances in the form of representation vectors of the source instance and the training instances. Processing circuitry 14 processes the raw data of the source instance and the training instances to generate the model representations of the source instance and the training instances in the described example.

In one embodiment, the computing system 10 utilizes the machine learning model to generate the representation vectors which are real-valued vectors of the source instance and the plurality of training instances which were used to train the machine learning model.

If the classification decision of the Support Vector Machine model 20 is being explained, the processing circuitry 14 computes the model's distance function on all of the instances (the source instance and training instances) to generate the representation vectors 24, 26 in one embodiment.

If the classification decision of Artificial Neural Network model 22 is being explained, the processing circuitry 14 uses the model's activation for each of the source instance and training instances at the second to last layer 23 of the network 22 to generate the representation vectors 24, 26 in one embodiment.

The calculated real-valued representation vectors 24, 26 of the source and training instances are distinct from the raw data of the source and training instances. Collectively, the representation vectors of the source and training instances created using either model 20 or 22 are stored as a representation matrix 28 within the storage circuitry 16 in one embodiment. In the illustrated embodiment, a representation vector 24 which corresponds to the source instance and a plurality of additional representation vectors 26 which correspond to the training instances are shown within representation matrix 28.

The processing circuitry 14 additionally executes the machine learning model with respect to the raw data of the source instance to classify the source instance in one embodiment.

Following the generation of the representation matrix 28 and classification of the source instance, the processing circuitry 14 of the computing system 10 accesses and processes the representation vectors 24, 26 of the source instance and the training instances as described further below with respect to FIGS. 3A-3D to identify or select relevant evidence to explain the classification decision of the source instance by the machine learning model 20 or 22.

In one example implementation, the processing circuitry 14 creates a topological structure using the representation vectors 24, 26 and which includes associations of the source instance with the training instances. Thereafter, the processing circuitry 14 processes the associations of the source instance and the training instances to identify a first subset of the training instances which have less relevance to the classification decision of the source instance by the machine learning model compared with a second subset of the training instances. Accordingly, in one embodiment, the processing circuitry 14 identifies or selects the second subset of training instances as evidence of the classification decision by the machine learning model 20 or 22 and the computing system 10 may communicate the second subset of the training instances to a user to explain the classification decision in one embodiment.

Other methods of explaining the classification decision of a machine learning model apart from FIGS. 3A-3D are possible and may include methods with more, less and/or alternative acts than those shown and described further below.

Figure 3A:
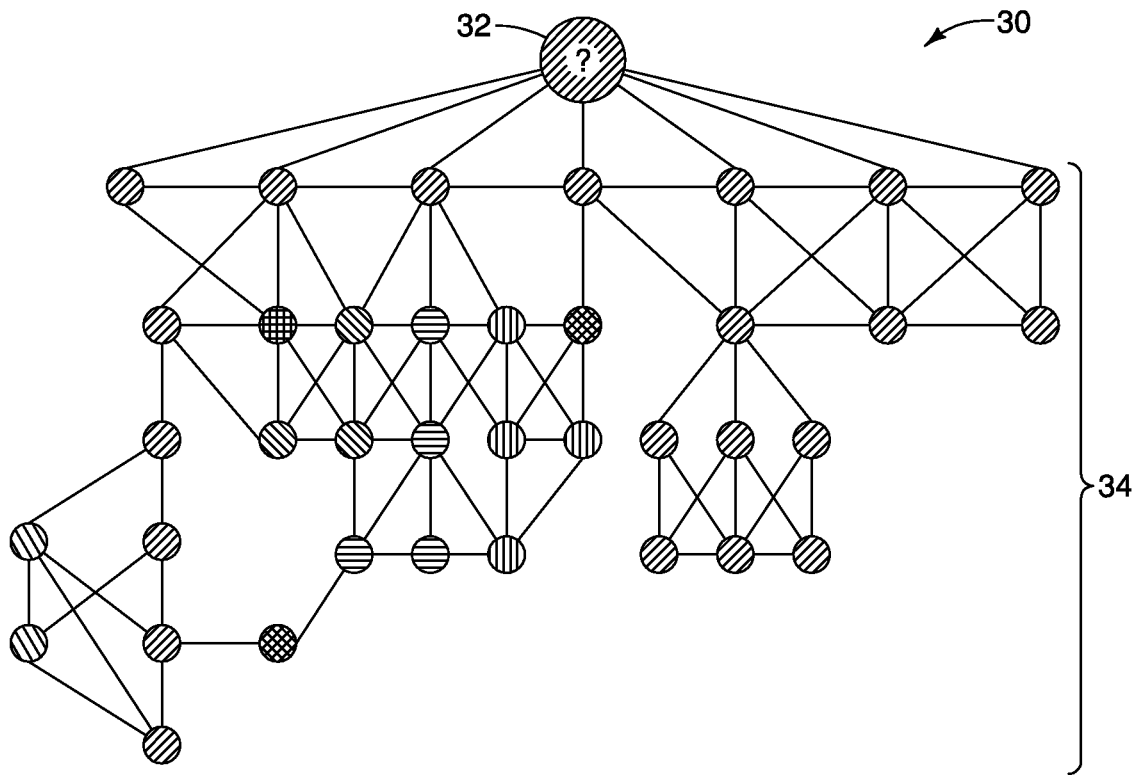
FIGS. 3A-3D are illustrative representations of creation and modification of a topological structure to identify relevant evidence to explain a classification decision of a machine learning model according to one embodiment.

Referring to FIG. 3A, the computing system 10 processes the representation vectors 24, 26 to build a topological structure 30 shown in FIG. 3A and which includes a plurality of associations which relate the source instance with the training instances. In the example embodiment, the source and training instances are shown as vertices and a plurality of edges between the instances indicate associations of the source instance with the training instances within the topological structure 30.

In FIG. 3A, some of the training instances are parent instances and some of the training instances are descendant instances of the parent instances (i.e., the parent instances are shown in rows above the descendant instances).

Though this topology can be built in different ways in the different embodiments, the computing system 10 in one embodiment computes a k-nearest neighbor graph using the representation vectors 24, 26 of the representation matrix 28. The processing circuitry 14 determines that an edge exists between two vertices u and v if no more than k−1 other instances are closer to u than v or vice versa in the described implementation. The distance between vectors 24, 26 can be computed in different ways and may be parameterized by a metric parameter.

In a more specific embodiment, the computing system 10 constructs a k-nearest neighbors (k=8) graph on the model's decision function for the training data and source instance with a Minkowski distance metric, which is described in additional detail in Archana Singh, Avantika Yadav, and Ajay Rana, K-means with three different distance metrics. *International Journal of Computer Applications* 67, 10 (2013), the teachings of which are incorporated herein by reference. Open source code exists for creating a k-nearest neighbors graph including in one example Scikit-learn 0.21.3 available at scikit-learn.org although any method may be used to generate a k-nearest neighbors graph.

The processing circuitry 14 uses the representation vectors 24, 26 of the source instance and the training instances to create the associations of the source instance with the training instances in the topological structure 30. This example embodiment allows instances to be connected in the topology when they have similar features that are important for classification without requiring similar features across all input dimensions.

The source instance 32 and training instances 34 shown in FIGS. 3A-3D have one of a plurality of different classifications which are illustrated by different shading/stippling in the drawings. In one embodiment, executed of the machine learning model 20 or 22 by processing circuitry 14 determines the classification of the source instance 32 while the ground truths of the raw data of the training instances 34 are used as the classifications of the training data 34 in the topological structure 30.

The topological structure 30 created by processing circuitry 14 is further processed as discussed below with respect to FIGS. 3B-3D to remove less relevant training instances 34 and identify suitable training instances as evidence for explaining the classification decision of the machine learning model.

Figure 3B:
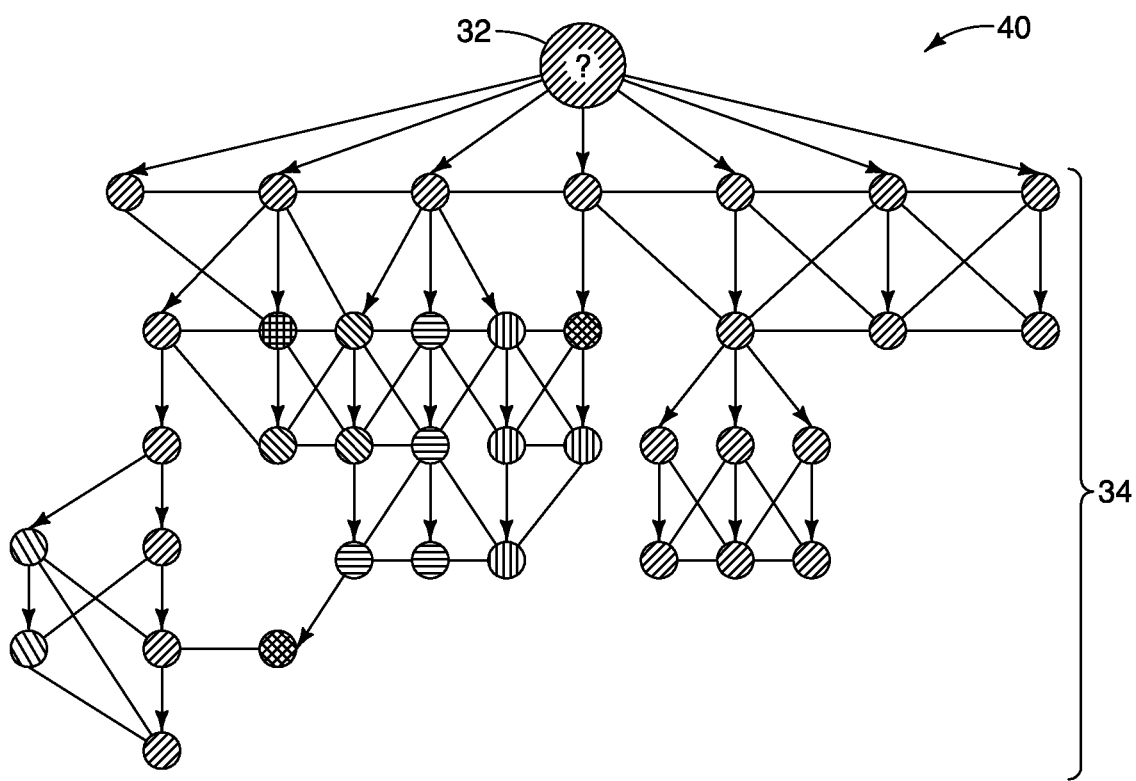

In the embodiment of FIG. 3B, the topological structure 30 of FIG. 3A has been further processed by the processing circuitry 14 to find the shortest-path tree 40 in the topology starting from source instance 32 to all of the training instances 34 in the topological structure 30. The illustrated shortest-path tree 40 includes the associations of the source instance 32 with the training instances 34 in the form of arrows. In one embodiment, Dijkstra's algorithm is used to find the shortest-path tree and additional details are discussed in West, Douglas Brent; *Introduction to Graph Theory*, Vol. 2. Upper Saddle River, NJ: Prentice hall, pp. 97-100, 1996, the teachings of which are incorporated herein by reference.

The shortest-path tree 40 of FIG. 3B is thereafter pruned in an example embodiment discussed below with respect to FIGS. 3C and 3D to remove less relevant training instances 34 from the shortest-path tree 40. In one embodiment described below, training instances which are less relevant to the classification decision are identified as one subset from another subset of the training instances which are considered to be more relevant to explain the classification decision of the source instance by the machine learning model. Processing circuitry 14 processes the associations of the source instance with the training instances of the shortest-path tree 40 to identify less relevant training instances as discussed below. In addition, processing circuitry 14 uses the classifications of the source instance and training instances to identify the less relevant training instances in the example embodiments discussed below.

Figure 3C:
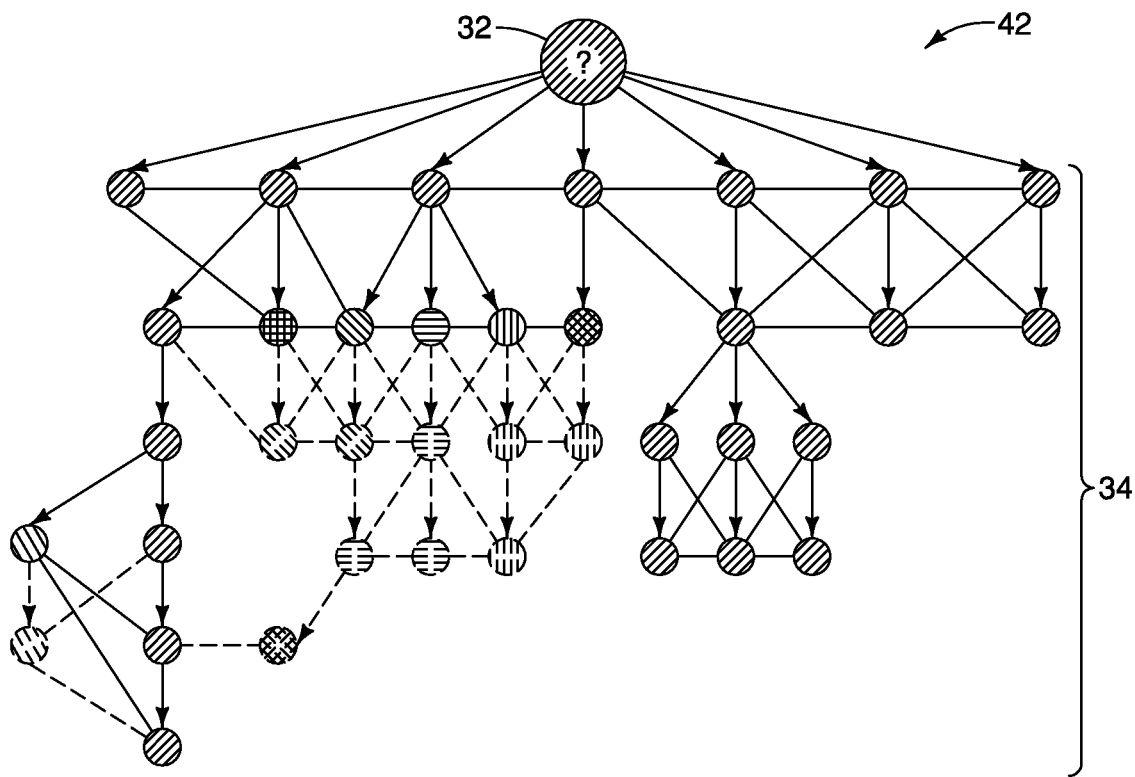

An initially modified topological structure in the form of an initially pruned shortest-path tree 42 is shown in FIG. 3C. In the illustrated embodiment, the training instances 34 in the tree 40 of FIG. 3B which have a parent whose classification is different from the classification of the source instance 32 are deleted from the shortest-path tree 40 of FIG. 3B resulting in the initially modified topological structure or initially pruned shortest-path tree 42 of FIG. 3C (nodes which have been deleted are shown in phantom). Furthermore, the descendants in FIG. 3B of the training instances 34 which are identified by the above pruning criteria as being less relevant to the classification decision of the source instance have also removed by the processing circuitry as shown in the shortest-path tree 42.

Accordingly, in one embodiment, the processing circuitry is configured to include selected ones of the descendant training instances 34 in the first subset of the training instances (i.e., the set of less relevant training instances) as a result of the selected descendant training instances having parent instances which have a different classification than the classification of the source instance. Put another way, the processing circuitry 14 removes each of the training instances 34 from the shortest-path tree which have a parent training instance in the shortest-path tree 40 which has a classification different than the classification of the source instance 32.

Figure 3D:
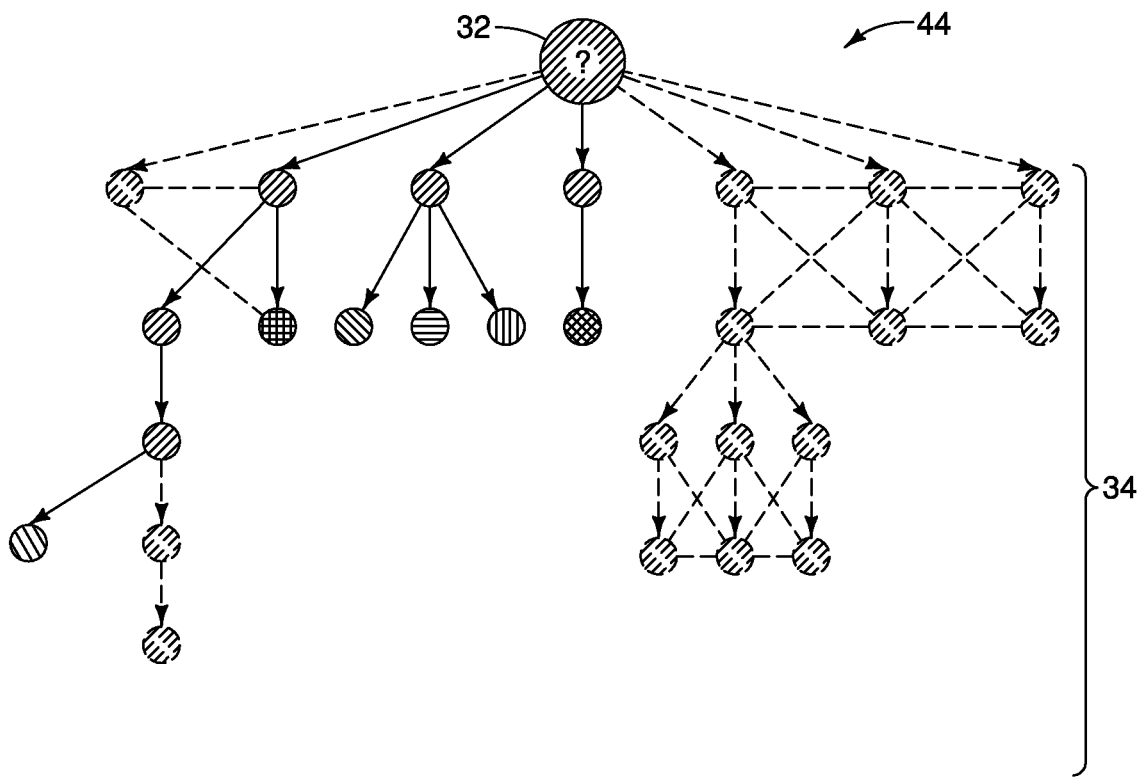

In FIG. 3D, the initially pruned shortest-path tree 42 has been further processed to remove additional training instances 34 from the shortest-path tree which are less relevant to the classification of the source instance 32. In particular, in one embodiment, training instances 34 of tree 42 which are non-leaf nodes and which have no descendants in the tree 43 that have a classification different from the classification of the source instance 32 are included in the first subset of training instances 34 and are removed from the initially pruned shortest-path tree 42 by the processing circuitry 14 providing a subsequently modified topological structure or further pruned shortest-path tree 44 shown in FIG. 3D.

The identified or selected remaining training instances 34 in the subsequently pruned shortest-path tree 44 of FIG. 3D are a second subset of training instances 34 along shortest paths between the source instance 32 and the nearby training instances 34 having a different classification from the predicted classification of the source instance 32 by the machine learning model. The remaining training instances 34 in the shortest-path tree 44 of FIG. 3D are the most influential training instances 34 to explain the classification decision of the source instance 32 by the machine learning model in one embodiment.

The raw data which correspond to the training instances 34 of the shortest-path tree 44 of FIG. 3D may be presented as evidence to the user to explain the classification decision of the source instance 32 by the respective model 20 or 22. In one embodiment, the raw data in the form of text and/or images of the remaining training instances 34 of FIG. 3D are communicated to the user as evidence to explain the classification of the source instance 32 by the machine learning model. The processing circuitry 14 may initiate and control the communication of the training instances 34 of the shortest-path tree 44 of FIG. 3D in one embodiment.

For example, the processing circuitry 14 may initiate or control the user interface 18 to display the raw data of the training instances 34 of the second subset which remain after the pruning discussed above with respect to FIGS. 3C and 3D. In one embodiment, the shortest-tree graph 44 including the associations of the second subset of the training instances 34 with the source instance 32 may also be displayed to the user.

The raw data of the remaining training instances 34 of the shortest-path tree 44 may also be communicated remotely from the computing system 10 to one or more users for use in explaining the classification decision of the source instance 32 by the machine learning model. Processing circuitry 14 may initiate communication of the raw data of the remaining training instances 34 externally of the computing system 10 via the data interface 12 in one embodiment.

At least some of the example explanation apparatus and methods described herein enable subject matter domain experts or analysts to make sense of complex data and predictive models including classification decisions of a machine learning model without having training in machine learning or data science. Some aspects of the disclosure enable domain experts to have an increased understanding of their data and the machine learning models used to process the data. The techniques described herein enable users to explore plausible paths that can help explain how a machine learning model arrived at a classification decision. Some of the disclosed apparatus and methods enable the users to interactively explore what if scenarios to gain insight about which features are the most important for the classification of a source instance, and how different model decisions could be reached by following different explanatory paths.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An explanation apparatus comprising:
   processing circuitry configured to:
   access a source instance which has been classified as a result of a classification decision of the source instance by a machine learning model;
   create associations of the source instance with a plurality of training instances; and
   process the associations of the source instance and the training instances to identify a first subset of the training instances which have less relevance to the classification decision of the source instance by the machine learning model compared with a second subset of the training instances;
   an interface configured to communicate information to a user; and
   wherein the processing circuitry is configured to control the user interface to communicate the second subset of the training instances to the user as evidence to explain the classification decision of the source instance by the machine learning model.

2. The apparatus of claim 1 wherein some of the training instances are parent instances and some of the training instances are descendant instances of the parent instances, and wherein the processing circuitry is configured to include selected ones of the descendant instances in the first subset of the training instances as a result of the selected descendant instances having parent instances which have a different classification than the classification of the source instance.

3. The apparatus of claim 2 wherein the processing circuitry is to include additional ones of the descendant instances in the first subset of the training instances as a result of the additional descendant instances being non-leaf nodes which each have no descendant instances that have a classification which is different than the classification of the source instance.

4. The apparatus of claim 1 wherein the source instance accessed by the processing circuitry comprises a model representation of raw data of the source instance, and wherein the processing circuitry is configured to access model representations of raw data of the training instances and to process the model representation of the source instance and the model representations of the training instances to create the associations of the source instance with the training instances.

5. The apparatus of claim 4 wherein the processing circuitry is configured to process the raw data of the source instance and the training instances to generate the model representations of the source instance and the training instances.

6. The apparatus of claim 1 wherein the processing circuitry is configured to create a topological structure including the source instance, the training instances and the associations of the source instance with the training instances.

7. The apparatus of claim 6 wherein the topological structure comprises a plurality of edges between the source instance and the training instances.

8. The apparatus of claim 6 wherein the topological structure is a k-nearest neighbor graph.

9. The apparatus of claim 6 wherein the processing circuitry is configured to use the topological structure to create a shortest-path tree from the source instance to the training instances and which includes the associations of the source instance with the training instances, and to process the associations of the source instance with the training instances of the shortest-path tree to identify the training instances of the first subset.

10. The apparatus of claim 1 wherein the processing circuitry is configured to control the interface to display the second subset of the training instances associated with the source instance to communicate the second subset of the training instances to the user.

11. The apparatus of claim 1 wherein the processing circuitry is configured to access classifications of the training instances.

12. The apparatus of claim 11 wherein the processing circuitry uses classifications of the source instance and the training instances to create the associations of the source instance with the training instances.

13. The apparatus of claim 11 wherein the processing circuitry is configured to use the classifications of the training instances to identify the first subset of the training instances.

14. The apparatus of claim 11 wherein the second subset comprises the training instances along a plurality of shortest paths between the source instance and the training instances having different classifications from the classification of the source instance.

15. The apparatus of claim 11 wherein the processing circuitry is configured to execute the machine learning model to classify the source instance.

16. The apparatus of claim 1 wherein the training instances were used to train the machine learning model prior to the classification of the source instance.

17. The apparatus of claim 1 wherein each of the first and second subsets of the training instances comprise plural ones of the training instances.

18. The apparatus of claim 1 wherein the processing circuitry is configured to control the user interface to communicate raw data that is associated with the training instances of the second subset to the user as additional evidence to explain the classification decision of the source instance by the machine learning model.

19. The apparatus of claim 1 wherein the source instance is unclassified prior to the classification by the machine learning model.

20. An explanation apparatus comprising:
processing circuitry configured to:
generate a k-nearest neighbors graph comprising a source instance and a plurality of training instances, and wherein the source instance and the training instances have a plurality of different classifications;
create a shortest-path tree from the source instance to the training instances;
first remove each of the training instances from the shortest-path tree which has a parent training instance in the shortest-path tree with a classification different than the classification of the source instance;
second remove each of the training instances from the shortest-path tree which is a non-leaf node in the shortest-path tree and which has no descendant instances which have a classification different than the classification of the source instance; and
after the first and second removings, initiate communication of at least one of the remaining training instances of the shortest-path tree to a user as evidence to explain a classification decision of the source instance by a machine learning model.

21. The apparatus of claim 20 wherein the processing circuitry is configured to use the machine learning model to generate model representations of the source instance and the training instances, and to use the model representations of the source instance and the training instances to generate the k-nearest neighbors graph.

22. The apparatus of claim 20 further comprising a user interface, and wherein the processing circuitry is configured to initiate display of the at least one of the remaining training instances using the user interface to initiate the communication of the at least one remaining training instance to the user.

23. The apparatus of claim 20 further comprising a user interface, and wherein the processing circuitry is configured to initiate display of the remaining training instances associated with one another within the shortest-path tree to initiate the communication of the at least one remaining training instance to the user.

* * * * *